(12) United States Patent
Baukholt et al.

(10) Patent No.: US 9,976,638 B2
(45) Date of Patent: May 22, 2018

(54) LINEAR UNIT AND METHOD FOR THE MANUFACTURE OF A LINEAR UNIT

(71) Applicant: Continental Teves AG & C o. oHG, Frankfurt (DE)

(72) Inventors: Theo Baukholt, Kriftel (DE); Johannes Görlach, Langgöns (DE); Pierre Schmidt, Lohr am Main (DE); Kristijan Tarandek, Neu-Isenburg (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 367 days.

(21) Appl. No.: 14/428,785

(22) PCT Filed: Sep. 9, 2013

(86) PCT No.: PCT/EP2013/068574
§ 371 (c)(1),
(2) Date: Mar. 17, 2015

(87) PCT Pub. No.: WO2014/044563
PCT Pub. Date: Mar. 27, 2014

(65) Prior Publication Data
US 2015/0240923 A1      Aug. 27, 2015

(30) Foreign Application Priority Data

Sep. 18, 2012  (DE) .................. 10 2012 216 674
Aug. 28, 2013  (DE) .................. 10 2013 217 161

(51) Int. Cl.
*F16H 25/24*   (2006.01)
*F16D 65/14*   (2006.01)
(Continued)

(52) U.S. Cl.
CPC ............. *F16H 25/24* (2013.01); *F16D 1/027* (2013.01); *F16D 1/072* (2013.01); *F16D 65/14* (2013.01);
(Continued)

(58) Field of Classification Search
CPC ....................................................... F16H 25/24
See application file for complete search history.

(56) References Cited

U.S. PATENT DOCUMENTS 5,295,406 A * 3/1994 Alfano ................ F16H 25/2204
                                                  74/89.39
6,454,042 B1 * 9/2002 Yoshida ............... B62D 5/0448
                                                  180/444
(Continued)

FOREIGN PATENT DOCUMENTS

DE       201 08 885 U1   10/2002
DE   10 2009 019 209 A1  11/2010
(Continued)

OTHER PUBLICATIONS

PCT International Search Report—dated May 12, 2013.
German Examination Report—dated Jan. 8, 2014.

*Primary Examiner* — Terence Boes
(74) *Attorney, Agent, or Firm* — Brinks Gilson & Lione

(57) ABSTRACT

It is the intention for a linear unit (7) for imparting an axially acting force, having a rotational-translational gear (8), in particular a ball screw, which has a threaded spindle (1) and a threaded nut (2), and having a force transmission element (3), which is in particular in the form of a thrust rod or thrust tube, to be improved such that fewer components are required and the assembly of the linear unit is kept as simple as possible. For this purpose, the threaded nut (2) and the force transmission element (3) are connected to one another
(Continued)

by means of a positively locking, in particular play-free connection, in particular by means of clinching.

15 Claims, 2 Drawing Sheets

(51) Int. Cl.
    *F16D 1/072*     (2006.01)
    *F16D 1/027*     (2006.01)
    *F16D 23/12*     (2006.01)
    *F16D 125/40*     (2012.01)
    *F16F 15/32*     (2006.01)
    *F16H 25/22*     (2006.01)

(52) U.S. Cl.
    CPC .... *F16D 2023/123* (2013.01); *F16D 2125/40* (2013.01); *F16F 15/324* (2013.01); *F16H 25/2204* (2013.01); *Y10T 29/49936* (2015.01); *Y10T 74/18576* (2015.01)

(56) References Cited

U.S. PATENT DOCUMENTS

| | | | |
|---|---|---|---|
| 8,127,884 B2* | 3/2012 | Asakura | B62D 5/0427 |
| | | | 180/443 |
| 8,944,208 B2* | 2/2015 | Kitamura | B62D 5/0448 |
| | | | 180/443 |
| 2002/0063014 A1* | 5/2002 | Yoshida | B62D 5/0427 |
| | | | 180/444 |
| 2005/0160846 A1 | 7/2005 | Chiang | |

FOREIGN PATENT DOCUMENTS

| | | |
|---|---|---|
| DE | 10 2010 039 916 A1 | 3/2011 |
| WO | WO 2006/074326 A2 | 7/2006 |
| WO | WO 2011/029812 A1 | 3/2011 |

\* cited by examiner

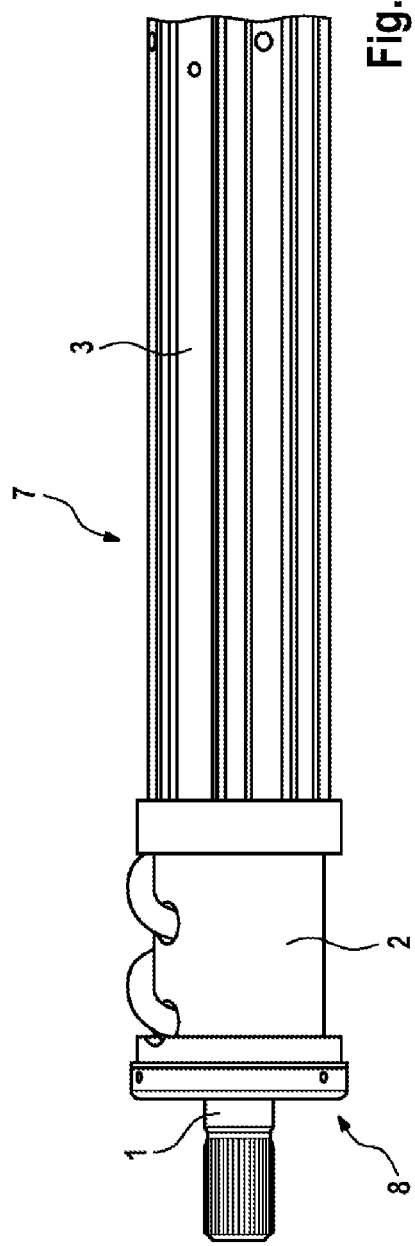
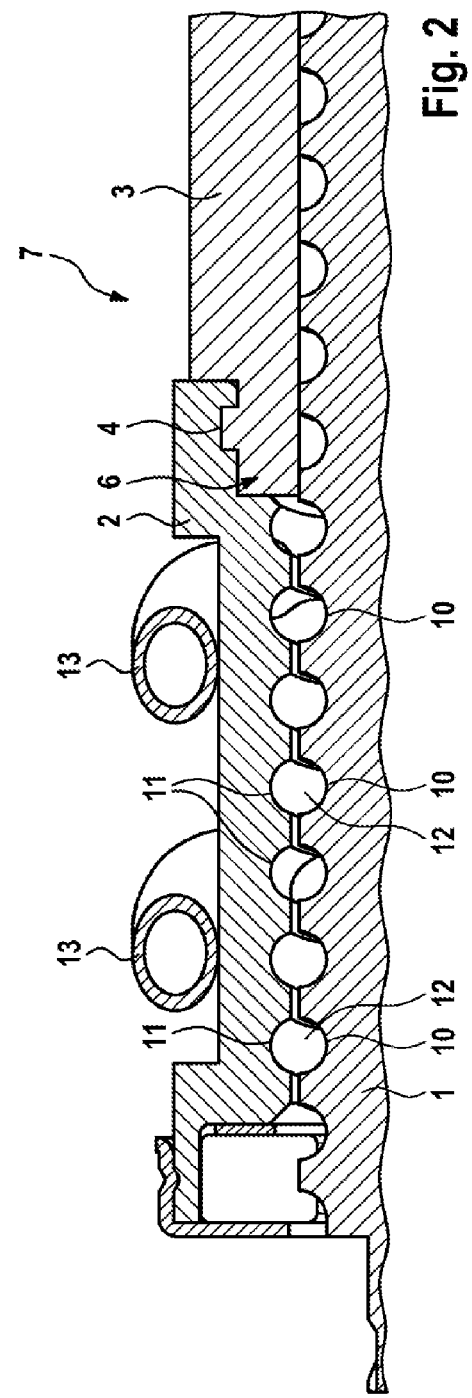

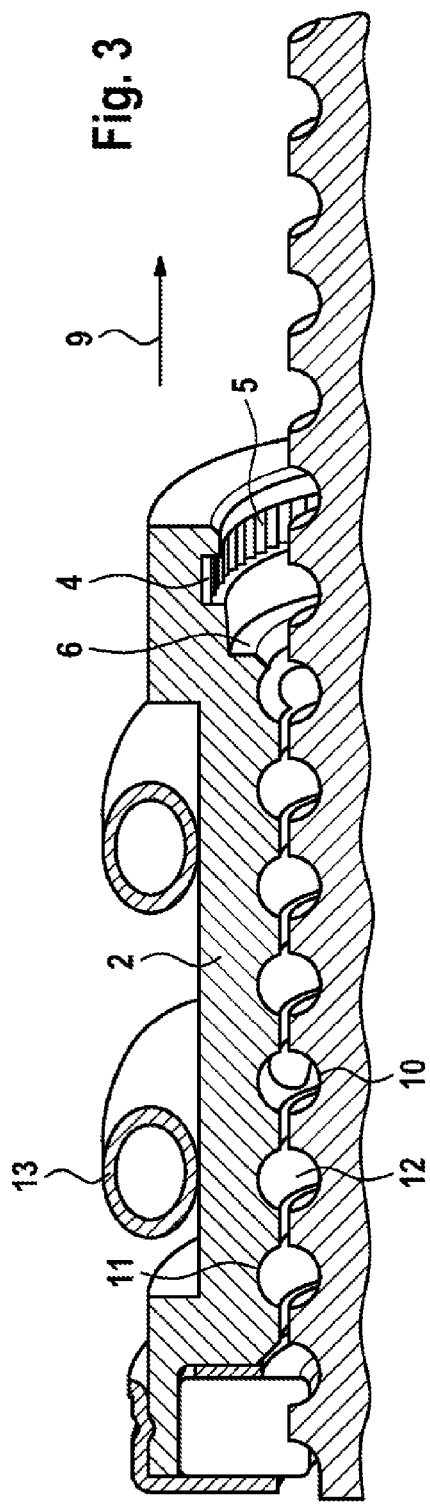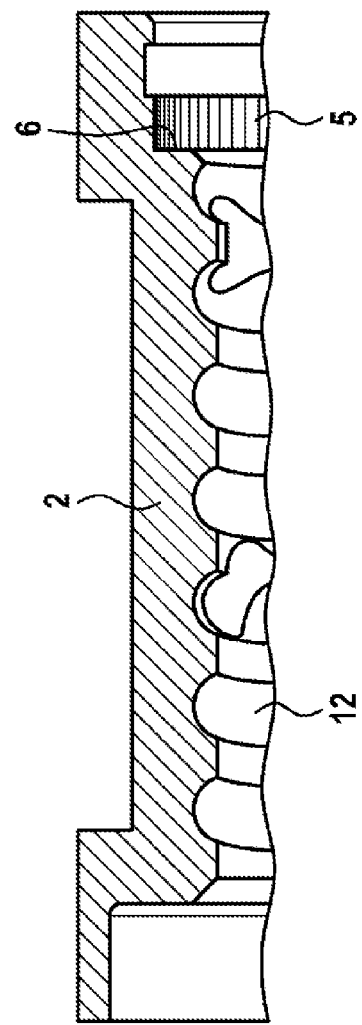

LINEAR UNIT AND METHOD FOR THE MANUFACTURE OF A LINEAR UNIT

CROSS REFERENCE TO RELATED APPLICATIONS

This application claims priority to German Patent Application Nos. 10 2012 216 674.2, filed on Sep. 18, 2012; 10 2013 217 161.7, filed on Aug. 28, 2013; and PCT/EP2013/068574, filed Sep. 9, 2013.

FIELD OF THE INVENTION

The invention relates to a linear unit for applying an axially acting force, having a rotational/linear translation mechanism, in particular a ball screw, which having a threaded spindle and a threaded nut, and a force transmission element, which is embodied, in particular, as a push rod or pressure tube. The invention also relates to a method for the manufacture of such a linear unit.

BACKGROUND

The aforementioned linear units are used, in particular, in "active" brake systems, in which brake pressure can be built up independently or in support of the brake actuation by the driver. In this case a linear unit, for example, translates a rotational motion of a threaded spindle into a linear motion of a threaded nut. The resulting travel of the threaded nut can then be used to move a piston and thereby to build up brake pressure in one or more brake circuits, particularly by hydraulic means. Here the spindle may be connected to the shaft of an electric motor, which is activated by an electronic control unit (ECU) in order to increase and/or reduce the pressure.

Linear units as described above are disclosed by DE 10 2009 019 209 A1 or DE 10 2010 039 916 A1, for example.

WO 2011/029812 discloses a brake system for motor vehicles, which as a pressure-generating device having a hydraulic cylinder-piston arrangement, the piston of which can be actuated by an electric motor by way of a rotational/linear translation mechanism. In the "brake-by-wire" operating mode the system pressure is built up by this linear actuator.

Technical developments of linear units are known in which the nut is connected to the profiled tube by way of an adapter or a sleeve, the connection between the sleeve and the nut being lasered and the connection between the profiled tube and the sleeve being calked. In the known construction, therefore, more components and connections are needed in order to connect the profiled tube and the nut together.

The object of the invention, therefore, is to improve a linear unit for a brake system for motor vehicles so that fewer components are needed than hitherto and the assembly of the linear unit is kept as simple as possible. A further object is to specify a corresponding method of manufacture.

SUMMARY

The above referenced object is achieved in respect of the linear unit in that the threaded nut and the force transmission element are connected to one another by a positively interlocking, in particular play-free connection, especially by material deformation such as by clinching.

Further, preferred embodiments of the invention are described herein with reference to the figures.

The invention proceeds from the consideration that known linear unit designs have various disadvantages. For one thing they have multiple parts that have to be connected to one another. For another this necessitates multiple connections between these components, making the design prone to potential failure. The connection between the nut and the force transmission element should be stable and reliable and lastingly capable of withstanding high travel stresses.

As has now been recognized, these requirements can be met by a positively interlocking connection between the threaded nut and the force transmission element. The two components are therefore directly connected through a positive interlock provided by deformation of at least one of the parts. This connection thereby serves for rigidly coupling the axial movement of the threaded nut and the force transmission element.

The connection between the threaded nut and the force transmission element is preferably of a play-free design. This allows especially precise traversing of a piston connected to the force transmission element. Material wear due to displacement and possible friction of the two components against one another is moreover avoided.

The positively interlocking connection between the threaded nut and the force transmission element is preferably made by clinching or press-joining (material deformation). Here a positively interlocking and permanent connection results due to spreading and extrusion.

Alternatively the positively interlocking connection may also be made by calking, the force transmission element in particular undergoing plastic deformation.

The threaded spindle is advantageously driven by an electric motor having a rotor and a stator, the threaded nut being supported so that it cannot rotate. In other words, the threaded nut is prevented by virtue of its support from turning as the spindle rotates. This ensures that the nut moves solely in an axial direction, that is to say in either direction of the longitudinal axis of the spindle (depending on the direction of rotation of the spindle). Here the rotor of the electric motor or a shaft connected thereto is preferably rigidly connected, directly and free of any torsion, to the spindle. The electric motor here is preferably actuated by a control unit (ECU) in order to build up and/or reduce the pressure as necessary.

The linear unit is preferably embodied as a hydraulic actuator or a hydraulic pressure source. Here the force transmission element is more preferably mechanically connected to a piston. The piston more preferably defines a fluid-filled pressure chamber in a bore. The piston is more preferably embodied as a hydraulic piston of a cylinder-piston arrangement.

The linear unit may alternatively also be used in an electromechanical brake system. For this purpose the piston would then press a brake lining directly against a brake disk as necessary, the electric motor here too being actuated by a control unit.

The threaded nut, especially in an area facing the force transmission element, preferably includes a slot or other form of a recess. Such a design, particularly in the case of clinching but also that of calking, allows the formation of a positively interlocking connection, in that when joining the force transmission element and the threaded nut together, the softer material of the force transmission element flows or is pressed into the slot. In this area the force transmission element is prevented, by the material of the threaded nut surrounding the slot, from moving in an axial direction, resulting in the positive interlock.

The force transmission element is preferably designed as a profiled tube. A tube of smooth surface design would be unable to brace the torque produced by the rotational motion.

The threaded nut is preferably braced against torsion on the force transmission element, more preferably by a positively interlocking support. Such a design configuration prevents any torsion of the threaded nut relative to the force transmission element. The force transmission element then interlocks positively with the threaded nut both in an axial and in a radial direction, so that an especially stable connection is achieved.

This torsional safeguard is advantageously achieved by arranging formed recesses, particularly in the form of a knurling or toothing, on the threaded nut, especially in a joining area between the threaded nut and the force transmission element.

In producing the positively interlocking connection of the threaded nut and the force transmission element, in particular the clinching, the force transmission element or the material thereof preferably fills the area of the formed recesses producing a positive interlock. The positive interlock is accordingly produced in a radial direction in that the softer material of the force transmission element flows into these formed recesses during the joining process.

The aforementioned object is achieved in respect of the method for the manufacture of a linear unit in that the threaded nut and the force transmission element are connected by a positively interlocking, in particular play-free connection, in particular by material deformation such as by clinching.

The advantages of the invention reside, in particular, in the fact that a positively interlocking connection of the threaded nut and the force transmission element obviates the need for any additional components, such as a sleeve, for example. On the one hand, dispensing with an additional component brings cost-savings. On the other the design space needed for the linear unit is also reduced due to the compact construction.

For producing the connection it is only necessary to join the parts in an axial direction, thereby affording particular ease of assembly. Moreover, this can easily be monitored through the clinching force. This is preferably done with the aid of a force/distance diagram, in which the clinching force is displayed as a function of the distance covered by the force transmission element in relation to the nut during clinching. In this diagram it is possible to define a banded area in which the force/distance correlation is indicative of a correctly performed clinching operation.

The resulting shape for the force transmission element, which is preferably designed as a profiled tube, is a simple one. It can be produced, for example, as an extruded profile with final machining on a lathe. The geometry of the threaded nut can be produced by deformation with little lathe machining needed to form a slot. The proposed connection of the spindle and the nut creates a simple, stable configuration that is very easy to manage in the production process.

BRIEF DESCRIPTION OF THE DRAWINGS

An exemplary embodiment of the invention is explained in more detail with reference to a drawing, in which in highly schematic form:

FIG. 1 shows a detail of a first exemplary embodiment of a linear unit according to the invention, FIG. 2 shows a longitudinal section through the linear unit according to FIG. 1, FIG. 3 shows a detail of a second exemplary embodiment of a linear unit according to the invention in a longitudinal section, and FIG. 4 shows a detail of a third exemplary embodiment of a linear unit according to the invention in a longitudinal section, The same parts are provided with the same reference numerals in all figures.

FURTHER DESCRIPTION OF INVENTION

FIG. 1 represents a detail of a first exemplary embodiment of a linear unit 7 according to the invention. An electric motor (not shown) generates a rotational motion, which is translated by a ball screw or a rotational/linear translation mechanism 8 into a linear motion. This motion serves to displace a piston (not shown), which builds up or reduces a pressure. The linear motion of the threaded nut 2 is therefore transmitted to the force transmission element 3 and then to the hydraulic piston of the piston-cylinder arrangement.

The rotational/linear translation mechanism 8 or the ball screw serves to convert the rotational motion performed by the rotor of the electric motor into a linear motion of the force transmission element 3, which is required in order to actuate the piston of a cylinder-piston arrangement. Here the ball screw includes a threaded spindle 1, a threaded nut 2 engaging with the threaded spindle 1 and multiple balls (not shown) arranged and running between them, which are carried, for example, in helical grooves 10 on the surface of the threaded spindle 1. Together with corresponding opposing grooves 11 in the threaded nut 2, helical channels 12 are thereby formed in which the balls run. Return channels 13 are provided for returning the balls.

The linear unit 7 in the present exemplary embodiment takes the form of a hydraulic actuator or a hydraulic pressure source having a piston. The piston in a bore defines a pressure chamber filled with fluid or is embodied as a hydraulic piston of a cylinder-piston arrangement. Instead of the ball screw shown, another rotational/linear translation mechanism 8 may be used, such as a simple motion-transmitting screw thread or a roller screw mechanism, for example.

On actuation of the linear unit 7 or energization of the electric motor (not shown), the rotor of the electric motor is set in rotational motion, which is transmitted to the threaded spindle 1. The rotational motion of the threaded spindle 1 gives rise to a traversing motion of the threaded nut 2 towards the right in FIG. 1, in which the force transmission element 3 and hence the piston (not shown) are also displaced towards the right, so that a hydraulic pressure is built up in a pressure chamber defined by the piston, the pressure being transmitted via a pressure connection to a hydraulic consumer, for example a hydraulic brake system of a motor vehicle.

The drive torque of the motor acts on the spindle or the threaded spindle 1. The reaction torque must be braced on the nut or the threaded nut 2 (it is necessary to prevent the threaded nut also being set in rotational motion as the threaded spindle 1 rotates) and the axial force must be transmitted to the piston. Both of these requirements are achieved by a force transmission element 3, which here is embodied as a profiled tube and which connects the threaded nut 2 and the piston to one another. In this case the profiled tube is made from an extruded profile.

In the case of the linear unit 7 represented, additional components for connecting the threaded nut 2 and the force transmission element 3 are dispensed with. Instead, these two parts are connected directly to one another by deformation of one of the parts such as by a clinching operation. For this purpose, as can be seen from the sectional representation in FIG. 2, a radial circumferential slot 4, into which material of the force transmission element 3 in the form of profiled tube flows due to the application of an impressing force during the joining process, is shown on the threaded nut 2. A positively interlocking, play-free connection is thereby produced, which is capable of transmitting axial forces, limited bending moments and the reaction torque. As shown by the figures threaded nut 2 forms in inside cylindrical surface with the slot 4 extending radially outwardly from the inside the cylindrical surface. Upon material deformation of the force transmission element 3 material from the force transmission element flows in a radially outward direction into mechanical interlocking engagement with the slot 4.

For this purpose the force transmission element 3 (profiled tube) is composed of a softer material than the threaded nut 2, so that in the joining process the softer material flows into the slot 4 of the threaded nut 2, substantially preserving the shape of the slot 4. In this case the threaded nut 2 is made from steel and the force transmission element 3, embodied as a profiled tube, is made from aluminum.

The force transmission element 3 is guided in an area remote from the nut 2 (not represented in FIGS. 1 to 4), so that it is axially moveable in relation to a housing of the linear unit and secured against torsion. The profiled tube is mechanically fixed to the piston in such a way that neither a relative axial movement nor a torsion force transmission between the two components is possible.

According to the second exemplary embodiment of a linear unit 7 according to the invention represented in FIGS. 3 and 4 a positively interlocking support to prevent torsion is additionally provided in the joining area of the two components (threaded nut 2 and force transmission element 3). In the embodiment represented in a longitudinal section in FIG. 3, the support is formed by knurling on the nut, that is to say formed recesses extending in an axial direction 9 are arranged on the threaded nut 2. In this instance, therefore, the threaded nut 2 is knurled. During clinching (or other type of material deformation operation) the profiled tube 3 fills this area with material, forming a positive interlock. This geometry is advantageously introduced to the threaded nut 2 by deformation; the profiled tube is given a rotationally symmetrical form prior to calking.

In the second exemplary embodiment in FIG. 3 the formed recesses 5 are arranged on the nut in the area of the slot 4; in the third exemplary embodiment in FIG. 4 the formed recesses 5 are arranged on the nut 2 in a limiting stop area 6 for the profiled tube on the electric motor side (see also FIG. 1).

Alternatively the threaded nut 2 may also be rolled in these areas. As a further alternative the torque bracing may also be provided by a conventional positive interlock, for example a lug on the profiled tube and a pocket on the nut, although the machining of the two components would seem to require a greater outlay in this case. As an alternative to formed recesses a polygonal shape may also be provided on the nut.

While the above description constitutes the preferred embodiment of the present invention, it will be appreciated that the invention is susceptible to modification, variation and change without departing from the proper scope and fair meaning of the accompanying claims.

The invention claimed is:

1. A linear unit for applying an axially acting force, having a rotational/linear translation mechanism, in the form of a ball screw, comprising a threaded spindle and a threaded nut, and a force transmission element, in the form of a push rod or a tube, the threaded nut and the force transmission element are connected to one another by a positively interlocking, play-free connection by material deformation of at least one of the threaded nut and the force transmission element;
    wherein the threaded nut is braced against torsion on the force transmission element by the positively interlocking connection;
    wherein a material of the force transmission element extends radially outward into a circumferential slot defined by the threaded nut.

2. The linear unit as claimed in claim 1, further comprising in that the threaded spindle is a driven by an electric motor having a rotor and a stator and the threaded nut is supported so that it cannot rotate.

3. A linear unit for applying an axially acting force, having a rotational/linear translation mechanism, in the form of a ball screw, comprising a threaded spindle and a threaded nut, and a force transmission element, in the form of a push rod or a tube, the threaded nut and the force transmission element are connected to one another by a positively interlocking, play-free connection by material deformation of at least one of the threaded nut and the force transmission element;
    wherein the linear unit is embodied as a hydraulic actuator or a hydraulic pressure source, wherein the force transmission element acts on a piston, which defines a fluid-filled pressure chamber in a bore or which is embodied as a hydraulic piston of a cylinder-piston arrangement.

4. The linear unit as claimed in claim 1, further comprising in that the threaded nut, in an area facing the force transmission element, forms a slot.

5. The linear unit as claimed in claim 4, further comprising in that in the manufacture of the positively interlocking connection of the threaded nut and the force transmission element, the material of the force transmission element is pressed into the slot.

6. The linear unit as claimed in claim 1, further comprising in that the force transmission element is provided in the form of a profiled tube.

7. The linear unit as claimed in claim 1, further comprising in that a formed recess, in the form of a knurling or a toothing, is arranged on the threaded nut, at a joining area between the threaded nut and the force transmission element.

8. The linear unit as claimed in claim 7, further comprising in that in producing the positively interlocking connection of the threaded nut and the force transmission element, the force transmission element fills the area of the formed recess producing the positively interlocking connection.

9. A method for the manufacture of a linear unit, comprising the steps of providing a rotational/linear translation mechanism, in the form of a ball screw, providing a threaded spindle and a threaded nut, and a force transmission element, connecting the threaded nut and the force transmission element by a positively interlocking, connection provided by deforming at least one of the threaded nut and the force transmission element, wherein the threaded nut is braced against torsion by the positively interlocking connection, wherein a material of the force transmission element extends radially outward into a circumferential slot defined by the threaded nut.

10. A method for the manufacture of a linear element in accordance with claim 9, further comprising the deforming provided by a clinching operation.

11. A method for the manufacture of a linear element in accordance with claim 9, further comprising deforming the force transmission element into the positively interlocking connection with the threaded nut.

12. A method for the manufacture of a linear element in accordance with claim 9, further comprising providing the force transmission element formed of a material softer than the material forming the threaded nut.

13. The linear unit as claimed in claim 1, further comprising in that the force transmission element is formed of a material softer than a material forming the threaded nut.

14. The linear unit as claimed in claim 1, further comprising in that the force transmission element is formed of aluminum and the threaded nut is formed of steel.

15. A linear unit for applying an axially acting force, having a rotational/linear translation mechanism, in the form of a ball screw, comprising a threaded spindle and a threaded nut, and a force transmission element, in the form of a push rod or a tube, the threaded nut and the force transmission element are connected to one another by a positively interlocking, play-free connection by a material deformation of at least one of the threaded nut and the force transmission element;

wherein the threaded nut is braced against torsion on the force transmission element by the positively interlocking connection support;

further comprising the threaded nut forming an inside diameter surface with a radially outwardly protruding groove and wherein the force transmission element defining a portion which fits radially inside of the inside diameter surface and upon deformation of the force transmission element, a material of the force transmission element flows into the outwardly protruding groove.

* * * * *